United States Patent [19]

Nieman et al.

[11] E Patent Number: Re. 31,972

[45] Reissued Date of Patent: Aug. 20, 1985

[54] CASTING MOLD WITH CONSTRICTING DEVICE

[75] Inventors: John R. Nieman, Pekin; Roger A. Worman, Peoria, both of Ill.

[73] Assignee: Caterpillar Tractor Co., Peoria, Ill.

[21] Appl. No.: 194,535

[22] Filed: Oct. 6, 1980

Related U.S. Patent Documents

Reissue of:

[64] Patent No.: 3,831,662
Issued: Aug. 27, 1974
Appl. No.: 317,522
Filed: Dec. 22, 1972

[51] Int. Cl.[3] ..... B22C 9/08

[52] U.S. Cl. ..... 164/362

[58] Field of Search ..... 164/133, 358, 359, 362, 164/363

[56] References Cited

U.S. PATENT DOCUMENTS

| | | | |
|---|---|---|---|
| 900,970 | 10/1908 | Washburn | 164/359 |
| 1,030,066 | 6/1912 | Erlandson | 164/363 X |
| 1,049,877 | 1/1913 | Lange | 164/359 X |
| 1,657,952 | 1/1928 | Zoda | 164/363 X |
| 2,313,517 | 3/1943 | Cameron | 164/358 X |
| 2,451,505 | 10/1948 | Myskowski et al. | 164/359 X |

FOREIGN PATENT DOCUMENTS 472744 4/1951 Canada .

OTHER PUBLICATIONS

Wildermuth, J. W., et al. "A Study of Thin Metal Ingate Restrictions in Steel and Ductile Iron Castings", Trans. of The American Foundryman's Society, vol. 76, 1968, pp. 258–263.

Wlodawer, Robert, "Controlled Solidification of Steel Castings", (Foundry Publishers) GMBH, Dusseldorf, West Germany, 1967, pp. 119–121.

Wlodawer, Robert, "Directional Solidification of Steel Castings,"Pergamon Press, pp. 86–94 and 242.

*Primary Examiner*—Nicholas P. Godici
*Attorney, Agent, or Firm*—William B. Heming

[57] ABSTRACT

A stricture is formed between riser and cast article in a conventional metal mold casting process to facilitate clean removal of the riser after casting by interposing thin-walled frangible constriction means between riser cavity and casting cavity prior to pouring molten metal; the flow of metal into casting cavity is also regulated thereby.

2 Claims, 4 Drawing Figures

CASTING MOLD WITH CONSTRICTING DEVICE

Matter enclosed in heavy brackets [ ] appears in the original patent but forms no part of this reissue specification; matter printed in italics indicates the additions made by reissue.

BACKGROUND OF THE INVENTION

This invention relates to metal foundry techniques. In particular, this invention relates to techniques employed in metal founding to obtain a formed metal casting which requires a minimum amount of grinding or machining after being removed from the mold.

Typically, cast metal articles are made in the foundry industry by introducing molten metal into casting molds, and allowing the metal to cool and harden. Since the molten metal shrinks on cooling, resulting in an imperfect casting if further molten metal is not introduced to fill the voids in the mold created by shrinkage, the industry conventionally employs risers, or molten metal reservoirs to supply molten metal to the filled mold as required during the cooling process.

It is necessary that these risers be provided with an opening or port communicating with the mold cavity sufficiently large to prevent the formation in the riser of a constricting throat at this juncture that will act as a heat dissipator or sink. This occurrence will, of course, result in a blockage of the channel between riser and mold with cooled, hardened metal, and prevent the liquid metal in the riser from flowing into the mold cavity as required. Thus, risers are normally provided with ports of fairly large cross-sectional area.

The use of risers with such large port areas has, however, contributed its own problems. Although the absence of a constricting throat in these risers generally permits sufficient molten metal into the mold cavity during hardening to obviate the problem of shrinkage in the casting, the presence of the large cross-sectional area constitutes a strong connection between casting and riser when the liquid metal therein has cooled and hardened.

The riser is, of course, integrally cast with the casted article in the mold, and the riser must subsequently be separated from the casting. Such separation is frequently effected by, for example, sawing apart the two sections in the vicinity of the port between riser and casting; the casting must then be ground off to remove excess metal, and machined to obtain a smooth finish in the separation area.

The separation process is further complicated by the fact that often padding metal is included in the casting at the juncture of riser and casting; this excess metal is provided as a "cushion" between the casting and the separation point in order to aid in preventing rupture of the casting itself when it is forcibly separated from the riser. This padding metal must also be removed by grinding prior to machining. These separation procedures are time-consuming and expensive, especially in terms of labor and time costs.

Another problem associated with the use of risers and the introduction of molten metal therethrough into the mold cavity is that of metal flow control between the riser and mold cavity. Although it is frequently desirable to retain the molten metal within the riser for a period of time sufficient to permit the disposition of impurities such as dross or slag to reduce the impurity content of the molten metal flowing into the casting cavity, constrictions required to effect this at the riser port have at times resulted in the metallic blockage problem noted above.

This problem has been partially solved by the use of metal strainers to trap larger impurities in the molten metal flow channels when casting such metals as aluminum or magnesium; these strainers cannot, however, be used when casting steel, as the very high temperatures involved would result in the fusion of these strainers.

Accordingly, it is an object of this invention to provide a means of casting metal articles by a process using at least one riser whereby the riser may be readily separated from the cast metal article after cooling.

It is a further object of this invention to provide a means of casting metal articles by a process using at least one riser whereby the flow of molten metal through the riser port into the mold cavity is controlled, thereby permitting impurities such as dross or slag to be disposed within the riser away from the riser port.

It is an additional object of this invention to provide a means of casting metal articles by a process using at least one riser whereby no blockage of the channel between riser and mold cavity occurs, and yet separation of the riser from the cast metal article after cooling may be readily effected.

It is another object of this invention to provide a means of casting metal articles by a process using at least one riser whereby the cast metal article may be readily separated from the riser after cooling, and require minimum amounts of grinding and/or machining thereafter to remove excess metal.

It is yet another object of this invention to provide an inexpensive means, effective at high temperatures such as encountered in steel casting, whereby a metal casting comprising a riser portion and cast article portion may readily be separated into its component parts.

Further objects and uses of the invention will be apparent from the following specification and claims appended hereto.

BRIEF SUMMARY OF THE INVENTION

These objects are accomplished by means of this invention which broadly comprises a frangible, non-fusible constricting means placed at the juncture of the riser port and the mold cavity. The constricting means is provided with a relatively thin apertured wall which precisely conforms to at least one dimension of the mold cavity and forms a surface thereof; the wall is of sufficient thinness with respect to the thermal conductivity of the wall material to prevent loss of heat with resultant premature cooling and hardening of the molten metal at the juncture.

BRIEF DESCRIPTION OF THE DRAWINGS

The constricting means of this invention is illustrated in the accompanying drawings in which.

DETAILED DESCRIPTION OF THE INVENTION

Figure 1:
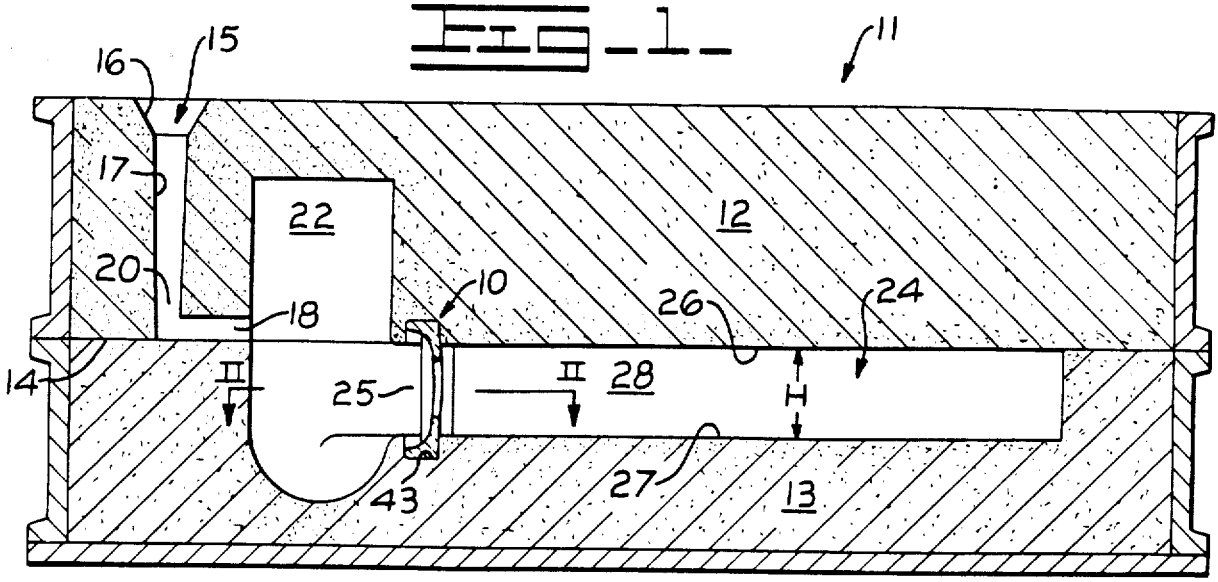
FIG. 1 is a longitudinal cross-sectional elevation of a typical mold including casting cavity, riser cavity, and conventional gating system, showing the constricting device in place.

With particular reference to FIG. 1, the constricting device of this invention is generally indicated by numeral 10, shown in place in green sand casting mold II. Mold II conventionally includes a cope portion 12 fitted on a drag portion 13, with the juncture of these two parts indicated by line 14.

Molten metal is poured into the mold through a conventional type gating system 15 which includes a pouring basin 16, a downsprue 17, and a runner 18. A choke 20 is provided at the lower end of downsprue 17 to regulate the flow of metal therethrough. Molten metal flows through downsprue 17 and runner 18 to riser cavity 22, and from riser cavity 22 into adjoining casting cavity 24 through riser port 25. Casting cavity 24 will of course conform to the desired mold pattern.

The mold cavity 24, as illustrated, is defined by upper surface 26 disposed along juncture line 14, lower surface 27, and cylindrically shaped side surface or wall 28. Riser port 25 intersects casting cavity 24 preferably at one of the casting cavity surfaces having a lesser dimension, in this instance at side surface 28 having a height H determined by the vertical spacing between upper and lower surfaces 26 and 27, respectively.

Figure 3:
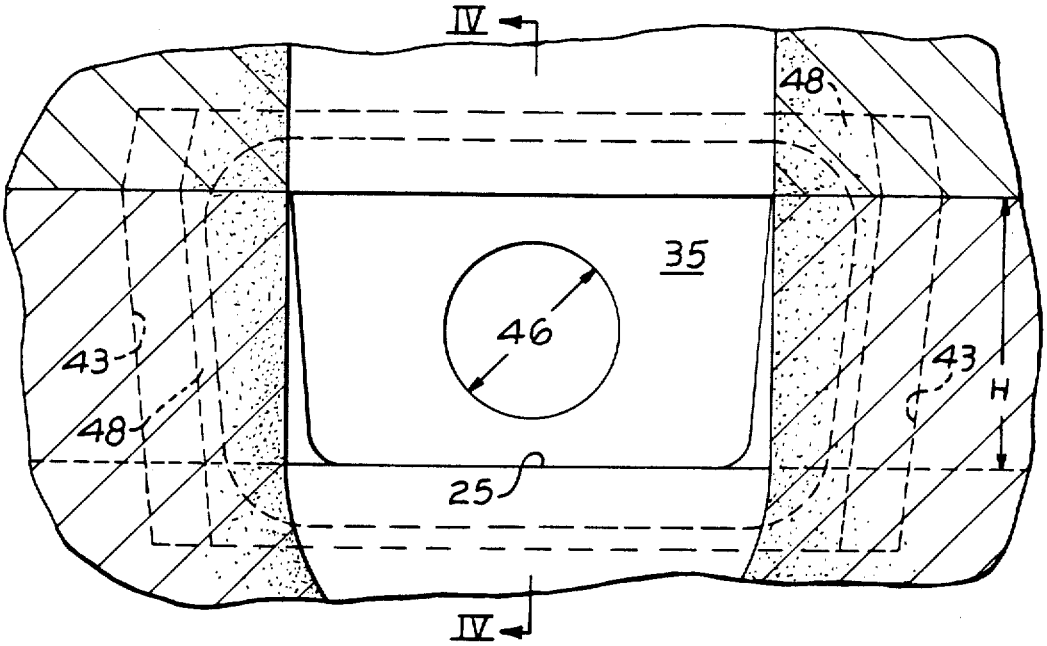
FIG. 3 is a cross-sectional elevation showing the constricting device in place, viewed from the riser cavity, along the lines III—III of FIG. 2.

The cross-sectional surface area of riser port 25 is generally rectangular, as shown in FIG. 3, and advantageously has a vertical dimension corresponding with height H of mold cavity 24.

Figure 4:
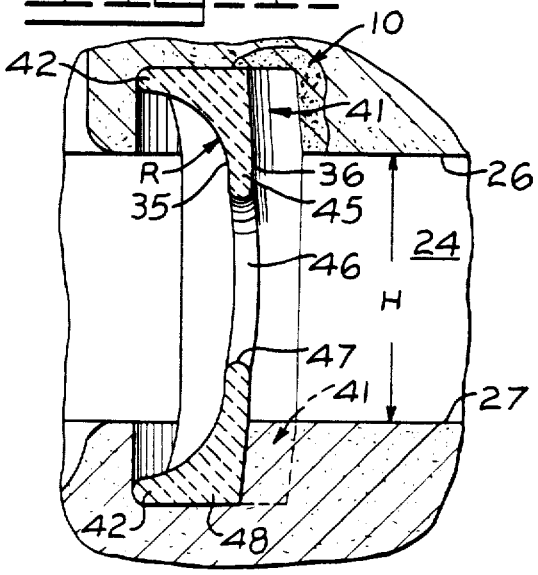
FIG. 4 is a cross-sectional view of the constricting device along the lines IV—IV of FIG. 3.

With particular reference to FIG. 4, constricting devicd 10 is shown comprising outer peripheral rib 48 which is tapered on the inner surface thereof to form this wall 45. The radius R between projections or flanges 42 of outer peripheral rib 48 is sufficiently large to provide a smooth transition to inlet side 35 of wall 45 to relieve stress concentrations therebetween which could otherwise be induced by high temperatures of the molten metal. Rib 48 further contributes strength and rigidity to constricting device 10, reducing likelihood of breakage thereof during handling or casting.

Wall 45 is further provided with aperture 46 through which molten metal flows into mold cavity 24 indicated by mold cavity surfaces 26 and 27. Aperture 46 is defined by rounded peripheral edge 47 of wall 45, whereby aperture 46 is narrowest in diameter approximately midway through wall 45.

Constricting device 10 is composed of a non-fusible material which will withstand high temperatures incountered in metal casting, and is preferably frangible to allow it to be readily broken away from the hardened metal casting. Many common fired ceramics will serve this purpose.

Wall 45 creates a stricture in the metal casting between the riser portion and cast article portion thereof, enabling the riser to be readily broken away from the cast article when the metal has cooled and hardened. It is necessary that wall 45 be sufficiently thin and have sufficient thermal conductivity to transmit a sufficient amount of heat to permit the proper directional solidification of a casting, and avoid premature blockage of the channel between riser and mold cavity with hardened metal.

The exact thickness of wall 45 will depend on the relative thermal conductivity of the material comprising constriction device 10; however, it is preferable that device 10 be formed of a ceramic material, and in this case a wall thickness of about one-eighth inch will suffice. In general, wall thicknesses of from about one-sixteenth inch to about one-fourth inch are contemplated.

Aperture 46, the sole connection between riser 22 and mold cavity 24, is proportioned relative to the size of choke 20 to control the flow of metal during pouring to permit the level of the molten metal in the riser cavity 22 to rise slightly above the aperture while the casting cavity is being filled. Impurities, such as slag and dross, normally floating on the surface of the metal are thus prevented from entering casting cavity 24.

The size and contour of the surface of the casting cavity 24 adjoining riser port 25, and the cross-sectional area or riser port 25, primarily determine the size and shape of constricting device 10. Outlet wall 36 comprises the forward surface of mold cavity 24 and is contoured in the desired pattern to form this surface. Rib 48, including wall 45 thereof extends beyond the mold cavity opening, defined by surfaces 26 and 27, as indicated at sections 41 of rib 48. As is best seen in FIG. 3, inlet wall 35 is larger than riser port 25; riser port 35 in this instance has a height dimension equivalent to that of mold cavity 24.

A recess 43 is provided in the mold to receive constricting device 10. Preferably, the recess 43 is so located as to allow constricting device 10 to fit as tightly as possible between mold cavity 24 and riser port 25 to avoid leakage of molten metal therebetween which would require additional grinding or machining.

Figure 2:
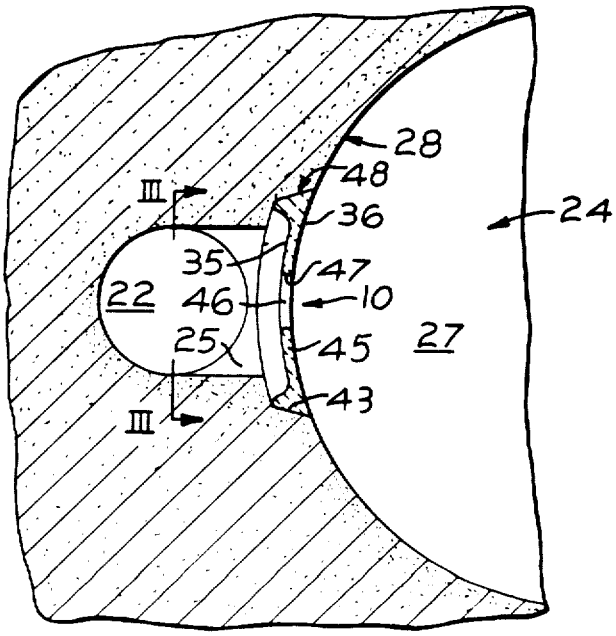
FIG. 2 is a cross-sectional plan view along the lines II—II of FIG. 1.

Constricting device 10 is firmly held in mold 11 by the portions of rib 48 which extend into mold 11 (FIGS. 1 and 2). Constricting device 10 may be formed by any conventional means; however, die casting is frequently advantageous as it provides a greater degree of flexibility in obtaining configurations necessary to conform to the corresponding mold pattern surface.

In operation, mold 11 is conventionally formed by packing molding sand in the cope portion 12 and drag portion 13 about a pattern (not shown) which conforms to the shape of the desired casting. The constricting device 10 is inserted into recess 43 when the mold is opened and the pattern removed. Although recess 43 can be formed in the mold by any desired method, it is conveniently formed therein by a core print added to the casting pattern. After the closing of the mold, molten metal poured into pouring basin 16 flows down downsprue 17, into runner 18 and begins filling riser cavity 22. The constricted aperture 46 permits the level of metal in the riser to rise above aperture 46 to prevent slag and dross floating on the surface of the metal from entering casting cavity 24 during the filling thereof. During the solidification of the molten metal, wall 45 permits the transmission of heat from the metal in the riser to the adjacent metal in the casting to insure proper directional solidification of the casting.

After complete solidification and cooling, mold 11 is usually placed on a mechanical shaker to remove the mold sand from around the metal. During this mechanical shaking operation, the riser will normally be broken off from the casting by inertial forces due to the relatively small size of the structure between riser and casting. In this process device 10 will be fractured and crumbled from the casting as well. This eliminates the necessity of laboriously removing the riser by hand. Furthermore, because of the relative closeness of the stricture to the surface of the casting, the casting is substantially free of superflouous metal normally found at the casting surface when the riser has been removed. Thus, the casting does not require any grinding or other preliminary operations performed on it prior to machining.

We claim:

1. In a mold assembly for casting having an upper portion and a lower portion and a casting cavity defined by said upper and lower portions in which a casting is to be formed, said upper and lower portions mating along an interface plane, said casting cavity communicating with a riser cavity in which a riser is formed for feeding molten material to the casting cavity as the casting solidifies, means for forming a stricture between the riser cavity and casting cavity and for regulating the flow of molten metal from the riser cavity into the casting cavity, said means including a constriction device *formed from a fired ceramic material and* having aperture means therein, *a thin wall of about one-eighth inch in thickness, and a thickened ribbed peripheral portion, said aperture means being an aperture defined by a rounded edge of the thin wall and of a size sufficient in inhibiting the flow of molten metal from the riser cavity into the casting cavity to maintain the level of molten metal within the riser cavity about said aperture means,* said device being interposed between the casting cavity and the riser cavity at the point of communication thereof, and *said thickened ribbed peripheral portion of* said device simultaneously engaging both said upper and lower portion of said mold when said portions are in mating engagement along said interface plane.

[2. The invention of claim 1 wherein said constriction device comprises a frangible thin-walled member defining an aperture therethrough and further having a thickened ribbed peripheral portion.]

[3. The invention of claim 1, wherein said constricting device is comprised of ceramic material.]

4. The invention of claim 2, wherein the thin wall of the constriction device is between about one-sixteenth inch and one-fourth inch thickness.

[5. The invention of claim 1, wherein said aperture means is *an aperture* of a size sufficient for inhibiting the flow of molten metal from the riser cavity into the casting cavity to maintain the level of molten metal within the riser cavity above said aperture means.]

6. [The invention of claim 1, wherein the] *In a mold assembly for casting having an upper portion and a lower portion and a casting cavity defined by said upper and lower portions in which a casting is to be formed, said upper and lower portions mating along an interface plane, said casting cavity communicating with a riser cavity in which a riser is formed for feeding molten material to the casting cavity as the casting solidifies, means for forming a stricture between the riser cavity and casting cavity and for regulating the flow of molten metal from the riser cavity into the casting cavity, said means including a constriction device having a thin wall and* aperture means [is] defined by a rounded edge of the thin wall, *said thin wall being of sufficient thinness with respect to the thermal conductivity of the wall material to prevent premature cooling and hardening of the molten material thereat said device being interposed between the casting cavity and the riser cavity at the point of communication thereof, and said device simultaneously engaging both said upper and lower portion of said mold when said portions are in mating engagement along said interface plane.*

[7. The invention of claim 2 wherein said constriction device is fabricated from high refractory insulating material. ]

[8. The invention of claim 7 wherein said constriction device is fabricated from ceramic material.]

* * * * *